(12) United States Patent
Koh et al.

(10) Patent No.: US 8,896,566 B2
(45) Date of Patent: Nov. 25, 2014

(54) DISPLAY APPARATUS AND CONTROL METHOD THEREOF

(75) Inventors: Sang-hyun Koh, Yongin-si (KR); Jeong-a Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 12/783,051

(22) Filed: May 19, 2010

(65) Prior Publication Data
US 2011/0096002 A1   Apr. 28, 2011

(30) Foreign Application Priority Data

Oct. 23, 2009   (KR) ........................ 10-2009-0101159

(51) Int. Cl.
*G06F 3/045* (2006.01)
*G06F 3/041* (2006.01)
*G06F 3/0354* (2013.01)
*G06F 3/046* (2006.01)

(52) U.S. Cl.
CPC ............ *G06F 3/03545* (2013.01); *G06F 3/046* (2013.01)
USPC .......................................... 345/174; 345/173

(58) Field of Classification Search
CPC ........ G06F 3/03; G06F 3/0338; G06F 3/0383
USPC .................................................. 345/173–179
See application file for complete search history.

(56) References Cited

U.S. PATENT DOCUMENTS

| 4,902,858 | A | * | 2/1990 | Yamanami et al. | 345/173 |
|---|---|---|---|---|---|
| 5,535,131 | A | * | 7/1996 | Sanders | 702/77 |
| 5,591,945 | A | * | 1/1997 | Kent | 178/18.04 |
| 7,623,120 | B2 | | 11/2009 | Liu et al. | |
| 8,368,669 | B2 | | 2/2013 | Katsurahira | |
| 2006/0262106 | A1 | * | 11/2006 | Suk | 345/179 |

FOREIGN PATENT DOCUMENTS

| CN | 1453741 A | 11/2003 |
|---|---|---|
| CN | 101042626 A | 9/2007 |
| CN | 101211558 A | 7/2008 |

OTHER PUBLICATIONS

Communication dated Jun. 3, 2014, issued by the State Intellectual Property Office of the People's Republic of China in counterpart Chinese Patent Application No. 2010105053098.

* cited by examiner

*Primary Examiner* — Waseem Moorad
(74) *Attorney, Agent, or Firm* — Sughrue Mion, PLLC

(57) ABSTRACT

A display apparatus and method for controlling interference includes a signal receiving unit which receives a signal in an effective frequency band from an input device; a signal processing unit which processes a signal on the effective frequency band to output a user input signal; a display unit which displays an image based on the user input signal; and a diminishing signal generating unit which generates a diminishing signal having a waveform diminishing a noise outside the effective frequency band.

20 Claims, 7 Drawing Sheets

DISPLAY APPARATUS AND CONTROL METHOD THEREOF

CROSS-REFERENCE TO RELATED APPLICATION

This application claims priority from Korean Patent Application No. 10-2009-0101159, filed on Oct. 23, 2009 in the Korean Intellectual Property Office, the entire disclosure of which is incorporated herein by reference.

BACKGROUND

1. Field

Apparatuses and methods consistent with the exemplary embodiments relate generally to a display apparatus and a control method thereof, and more particularly, to a method and apparatus for generating a waveform to diminish a noise.

2. Description of the Related Art

Generally, an electromagnetic resonance (EMR)-type electronic pen used as an input device on a tablet personal computer (PC) is operated with a specially-designed pen and a specially-designed sensing board. In this case, a magnetic field generated in a surface of the sensing board induces a minute energy in a resonance circuit existing in an inner part of the electronic pen, and the resonance circuit of the electronic pen uses the energy to transmit a magnetic signal to the sensing board. By repeating these processes during operation of the electronic pen on the sensing board, the sensing board can recognize the position and the angle of the electronic pen. Furthermore, the sensing board can recognize general information, an input speed, an amount of pressure applied by the electronic pen to the sensing board, etc.

The magnetic signal transmitted through the resonance circuit of the electronic pen has a resonance frequency which is used when transmitting the magnetic signal to the sensing board. In some instances, a magnetic signal emanating from a clock noise in an inner part of the sensing board may cause interference with the resonance frequency of the electronic pen. Furthermore, interference with the resonance frequency of the electronic pen may be caused by a noise emanating from a source other than the sensing board. If the resonance frequency deviates, incorrect information about the electronic pen may be received at the sensing board. Accordingly, this interference may cause problems during operation of the sensing board with the electronic pen.

SUMMARY

One or more exemplary embodiments provide a display apparatus and a control method thereof for removing a noise surrounding an effective resonance frequency, etc., through generation of an interference waveform to prevent a resonance frequency generated in an inner part of the display apparatus from interfering with an effective resonance frequency generated in an EMR-type electronic pen.

According to an aspect of an exemplary embodiment, there is provided a display apparatus including: a signal receiving unit which receives a signal in an effective frequency band from an input device; a signal processing unit which processes the signal in the effective frequency band to output a user input signal; a display unit which displays an image based on the user input signal; and a diminishing signal generating unit which generates a diminishing signal having a waveform diminishing a noise outside the effective frequency band.

The effective frequency band may include a band of a resonance frequency in which the input device resonates.

The display apparatus may further include a magnetic field generating unit which generates a magnetic field inducing a resonance in the input device.

A signal in the effective frequency band may include at least one of information of a pointing coordinate, a pointing angle, input information, a speed and an applied pressure of the input device.

The noise may be a signal having a value of equal to or more than a predetermined amplitude in the effective frequency band.

A frequency band of the diminishing signal may be a band of approximately 0-532 KHz and a band of approximately 594 KHz-1 MHz.

The diminishing signal generating unit may generate the diminishing signal during a predetermined time when a signal in the effective frequency band is sensed.

According to an aspect of another exemplary embodiment, there is provided a method of controlling interference comprising: receiving a signal in an effective frequency band from an input device; generating a diminishing signal having a waveform diminishing a noise outside the effective frequency band; outputting a user input signal by processing the received signal in the effective frequency band; and displaying an image based on the outputted user input signal.

The effective frequency band may include a band of a resonance frequency in which the input device resonates.

The method of controlling interference may further include generating a magnetic field inducing a resonance of the input device.

A signal in the effective frequency band may include at least one of information of a pointing coordinate, a pointing angle, input information, a speed and an applied pressure of the input device.

The noise may be a signal having a value of equal to or more than a predetermined amplitude in the effective frequency band.

A frequency band of the diminishing signal may be a band of approximately 0-532 KHz and a band of approximately 594 KHz-1 MHz.

The generating of the diminishing signal may include generating the diminishing signal during a predetermined time when a signal in the effective frequency band is sensed.

BRIEF DESCRIPTION OF THE DRAWINGS

The above and other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
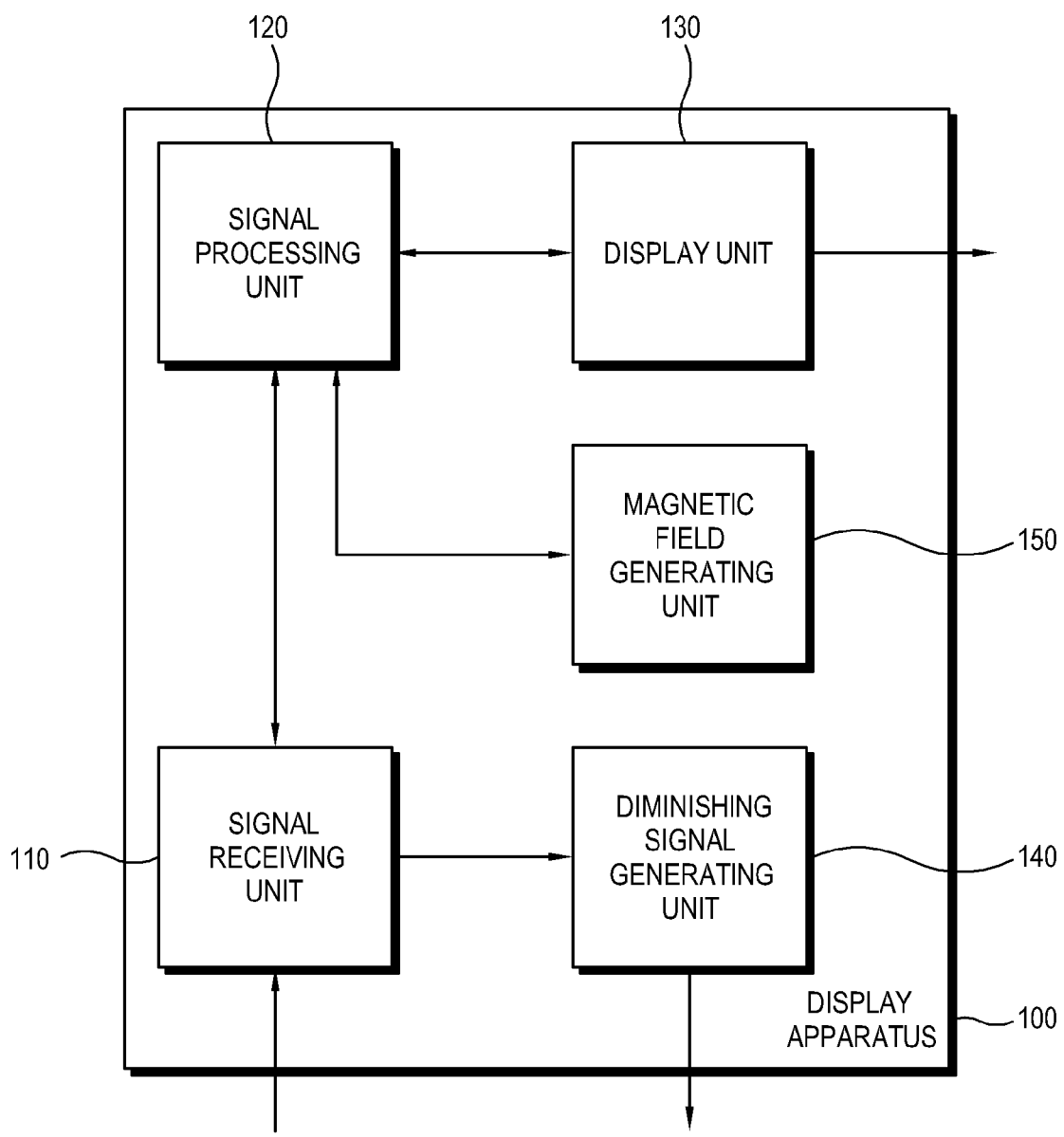
FIG. 1 is a block diagram illustrating a configuration of a display apparatus according to an exemplary embodiment.

Reference will now be made in detail to exemplary embodiments, examples of which are illustrated in the accompanying drawings, wherein like reference numerals refer to like elements throughout. The exemplary embodiments are described below so as to provide an explanation by referring to the figures. Repetitive description with respect to like elements of different embodiments may be omitted for the convenience of clarity. Expressions such as "at least one of," when preceding a list of elements, modify the entire list of elements and do not modify the individual elements of the list.

FIG. 1 is a block diagram illustrating a configuration of a display apparatus according to an exemplary embodiment.

A display apparatus 100 according to an exemplary embodiment may be embodied by an electronic book (E-book), a tablet personal computer (PC), a personal digital assistant (PDA), a mobile terminal, a digital television (TV), etc. Furthermore, the display apparatus 100 according to the exemplary embodiment may be embodied by any electronic device capable of recognizing a magnetic signal input from an electromagnetic resonance (EMR)-type input device.

The display apparatus 100 according to one exemplary embodiment may include a signal receiving unit 110, a signal processing unit 120, a display unit 130, a diminishing signal generating unit 140 and a magnetic field generating unit 150.

The signal receiving unit 110 receives a magnetic signal from an input device (not shown). In detail, the signal receiving unit 110 may receive a magnetic signal which is transmitted by a resonance circuit of the input device. In order to receive the magnetic signal, the signal receiving unit 110 may include a coil sensing a magnetic signal.

The signal receiving unit 110 receives a signal in an effective frequency band from the input device. An effective frequency may be an operating frequency with which the display apparatus 100 operates. In this case, the range of the effective frequency may be changed depending on the property of the display apparatus 100 or the input device. The effective frequency band may include the band of a resonance frequency in which the input device resonates. According to one exemplary embodiment, the band of the resonance frequency in which the input device resonates may be approximately 532.25-593.75 KHz. A signal in the effective frequency band may include information of at least one of a pointing coordinate, a pointing angle, input information, a speed of the input device and an applied pressure of the input device.

The signal processing unit 120 processes a signal in an effective frequency band to output a user input signal. The user input signal may be control information input by the input device.

More specifically, the signal processing unit 120 may generate a user input signal from information included in a signal in an effective frequency band (that is, a pointing coordinate, a pointing angle, an input information, speed, applied pressure, etc. of the input device). In this case, the user input signal may be generated in a digital type. For example, the signal processing unit 120 may generate a user input signal with respect to the thickness of a letter being written on, based on pressure information from the input device.

The signal processing unit 120 may output a generated user input signal to the display unit 130, a control unit (not shown), etc. In this case, the display unit 130, the control unit, etc. receiving the user input signal may operate based on the user input signal.

In one exemplary embodiment, display unit 130 displays an image based on the user input signal output by the signal processing unit 120. For example, if a user input signal related to a letter position is received, the display unit 130 may display a letter to a corresponding position. If a user input signal related to a letter thickness is received, the display unit 130 may display a letter in a corresponding thickness.

The display unit 130 may include a display panel embodied by a liquid crystal display (LCD), an organic light emitting display (OLED), a plasma display panel (PDP), etc.

In one exemplary embodiment, the diminishing signal generating unit 140 generates a diminishing signal having a waveform diminishing a noise outside an effective frequency band. The diminishing signal may have an interference waveform attenuating a noise waveform. According to an exemplary embodiment, the frequency band of the diminishing signal may be a band of approximately 0-532 Kilohertz (KHz) and a band of approximately 594 KHz-1 Megahertz (MHz) (KHz).

A noise may be a signal having a frequency surrounding that of an effective frequency band. That is, the noise may be a signal having a value equal to or more than a specific deviation from a predetermined amplitude in an effective frequency band. For example, a signal having the range of the amplitude deviating from an effective frequency band by equal to or more than +/−2 volts may be determined to be the noise. In this case, a signal having the amplitude within +/−2 volts may be determined to be a signal in an effective frequency band which is not considered noise.

According to one exemplary embodiment, the diminishing signal generating unit 140 may generate a diminishing signal during a predetermined time when a signal in an effective frequency band is sensed. For example, if an effective frequency band is the range of approximately 532.25-593.75 KHz, and if an input signal is generated with respect to an effective frequency band, the diminishing signal generating unit 140 may initially generate a diminishing signal in a band of approximately 0-532 KHz and a band of approximately 594 KHz-1 MHz. In this case, if an input by the input device is generated at 200 dots per second, a diminishing signal may be generated during a 500 millisecond (ms) time in an initial input of the input device.

In one exemplary embodiment, the magnetic field generating unit 150 may generate a magnetic field inducing a resonance of the input device. To generate a magnetic field, a coil in a loop shape may be formed with a surface of the magnetic field generating unit 150.

The input device may be an electronic pen, a writing pen, a pointer, etc. The input device operates by electromagnetic resonance (EMR), and therefore includes a resonance circuit therein. The input device uses a magnetic energy induced in the resonance circuit from a magnetic field formed in a surface of the display apparatus 100 to transmit a magnetic signal to the display apparatus 100.

Generally, an instrument such as a shield, etc. is used to block a noise outside an effective frequency band generated in a system. When using the instrument in a product such as a display apparatus, the volume and the weight of the product increases, and the price of the product increases due to the increased cost of manufacturing the product with the instrument.

In one exemplary embodiment, by generating a diminishing waveform attenuating a noise in a system, the noise is blocked without the use of an instrument. Accordingly, errors in recognizing an input signal of an input device due to noise may be prevented, thereby improving reliability of an embedded system, and permitting the display apparatus to be more slim.

Figure 2A:
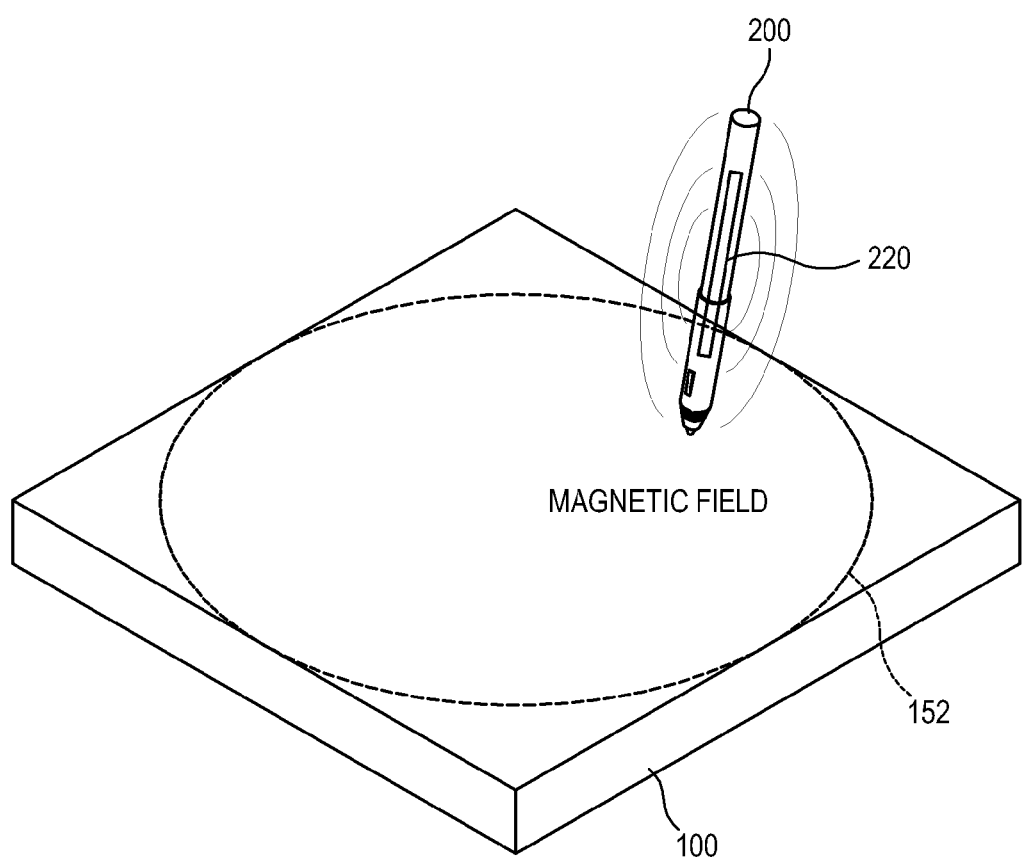
FIG. 2A is an illustration of a process of recognizing an input device at the display apparatus, according to an exemplary embodiment.

FIG. 2A is an illustration of a process of recognizing the input device in the display apparatus according to an exemplary embodiment.

An exemplary embodiment of a method of recognizing an EMR-type input device 200 is as follows. If a movement of the input device 200 is sensed on a surface of a panel (not shown) of the display apparatus 100, the display apparatus 100 generates a magnetic field 152 inducing a resonance of the input device 200. More specifically, the display apparatus 100 may generate the magnetic field 152 by supplying a current to the loop coil formed in the magnetic field generating unit 150. Accordingly, the magnetic field 152 is formed on the surface of the panel of the display apparatus 100. The magnetic field 152 formed on the surface of the panel induces a magnetic energy in a resonance circuit 220 of the input device 200.

The input device 200 includes the resonance circuit 220 therein. The input device 200 receives a magnetic energy from the magnetic field 152 to store in the resonance circuit 220 when the input device 200 is passing through the magnetic field 152 formed on the surface of the panel of the display apparatus 100. In this case, if the input device 200 comes in contact with a specific point on the surface of the panel, a magnetic signal is transmitted again from the input device 200 to a surface of the loop coil. More specifically, the input device 200 generates a magnetic signal with the magnetic energy stored in the resonance circuit 220, and transmits the generated magnetic signal to the display apparatus 100. By continually repeating these steps, the display apparatus 100 can recognize the position, the angle, etc. of the input device 200.

Figure 2B:
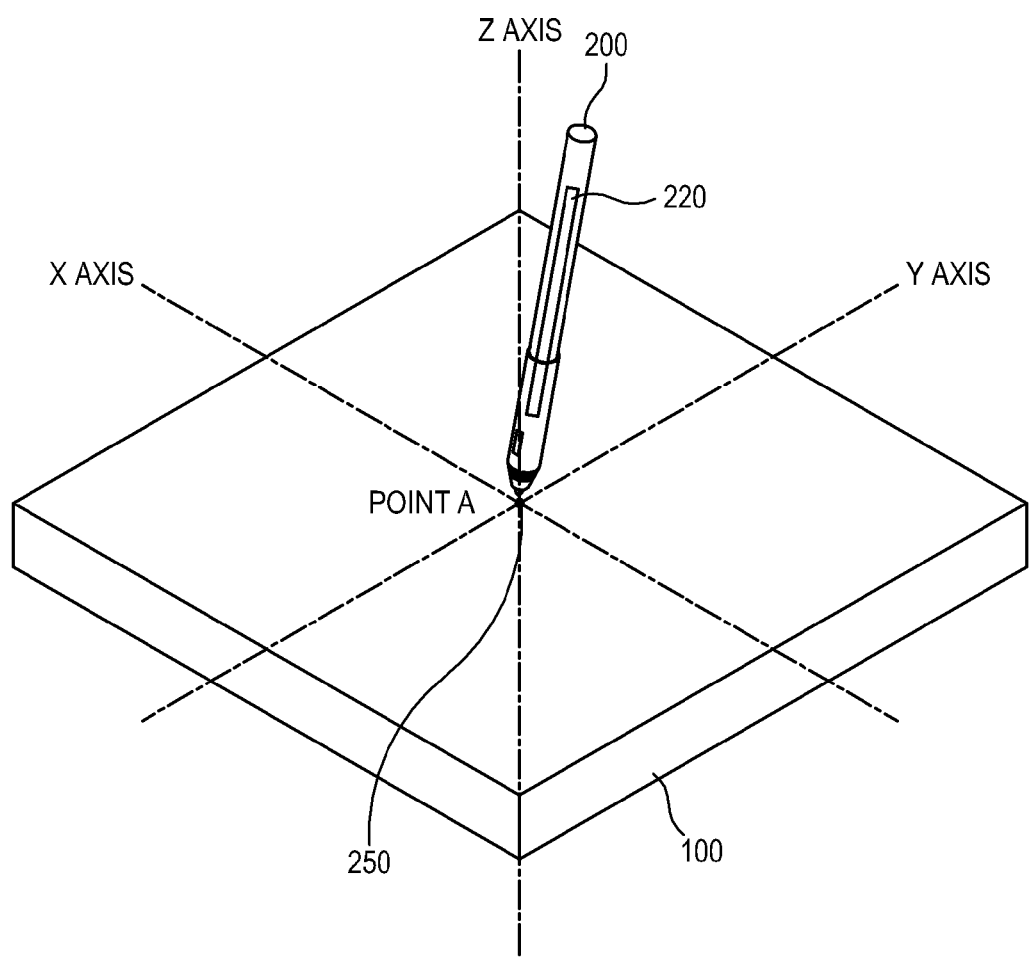
FIG. 2B is an illustration of a method of recognizing information input from the input device to the display apparatus, according to an exemplary embodiment.

FIG. 2B is an illustration of a method of recognizing information input from the input device to the display apparatus, according to an exemplary embodiment.

The display apparatus 100 may receive a signal in an effective frequency band from the input device 200. In this case, the signal in the effective frequency band may include at least one of information of a pointing coordinate, a pointing angle, input information, speed and an applied pressure of the input device 200.

As shown in FIG. 2B, if the input device 200 comes in contact with a point A 250 on a display panel, the display apparatus 100 recognizes the coordinate of the input device 200. The coordinate of the input device 200 may include coordinates on an X axis, Y axis and Z axis. In this case, the pointing coordinate of the input device 200 may be obtained by using an X axis coordinate and a Y axis coordinate. The pointing angle of the input device 200 may be obtained by using an X axis coordinate, a Y axis coordinate and a Z axis coordinate. The speed of the input device 200 may be obtained by determining a rate of change between pointing coordinates over time of an X axis coordinate, a Y axis coordinate and a Z axis coordinate. The pressure of the input device 200 being applied to the display apparatus 100 may be obtained based on the intensity of a magnetic signal received from the resonance circuit 220 of the input device 200.

Figure 3A:
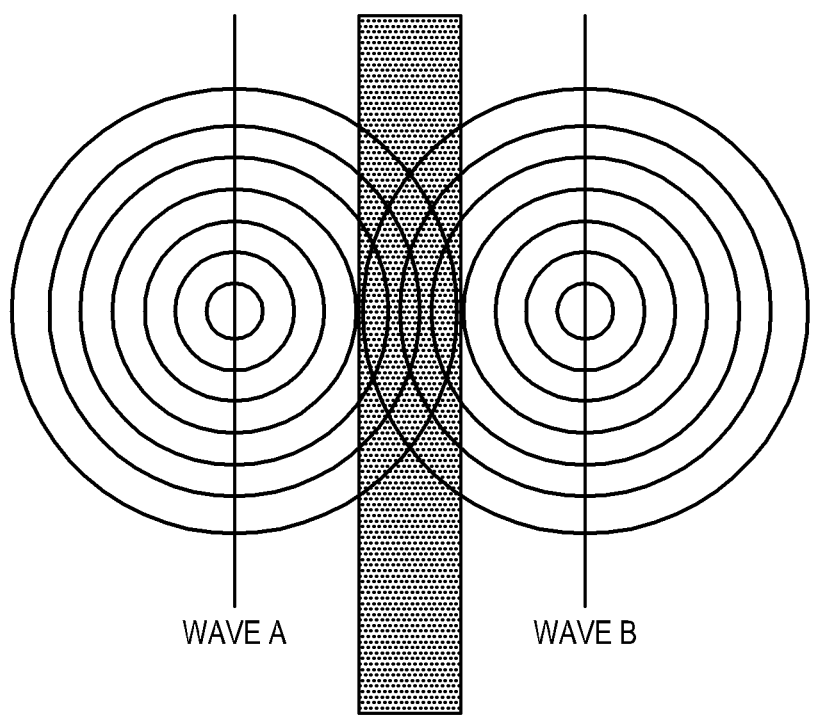
FIGS. 3A to 3C are illustrations of a diminishing signal generated in the display apparatus, according to an exemplary embodiment.
Figure 3B:
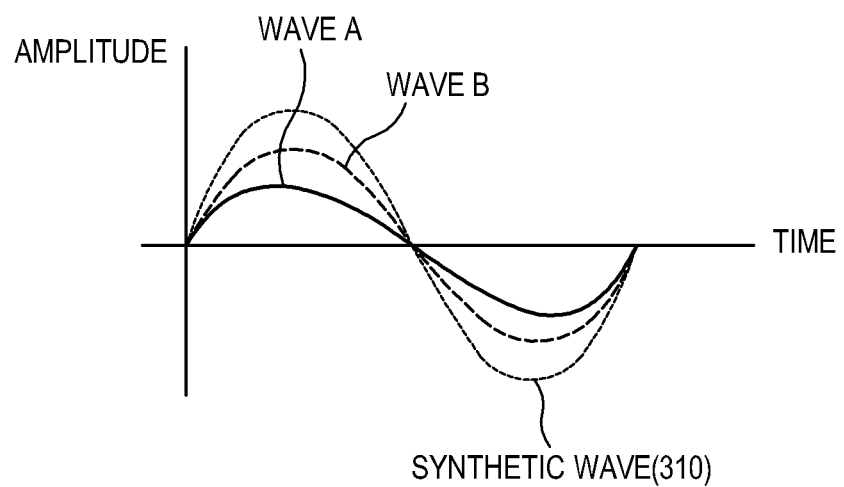
Figure 3C:
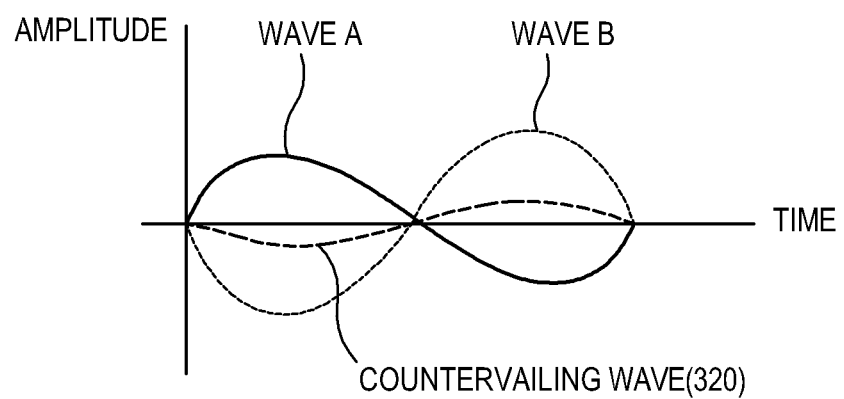

FIGS. 3A to 3C are illustrations of a diminishing signal generated in the display apparatus according to an exemplary embodiment.

If a magnetic signal is generated by the input device 200, a noise may be generated from an inner part of the display apparatus 100, or a noise may emanate from an outside source. In this case, the noise signal is overlapped with the magnetic signal from the input device 200, so that the magnetic signal from the input device 200 is distorted.

FIG. 3A illustrates an example where a wave A and a wave B are overlapped. If wave A and wave B are overlapped, the two waves cause interference. Accordingly, the original wave is deformed. That is, wave A and wave B are deformed to a shape like a synthetic wave 310 of wave B and wave A as shown in FIG. 3B.

To prevent deformity of the wave, a attenuating waveform is generated to remove an interfering waveform. For example, as shown in FIG. 3C, a attenuating waveform 320 is generated, by which the wave A is attenuated in the waveform B, thereby preventing interference by the wave A.

With this principle, a diminishing waveform for diminishing a noise is overlapped with a received magnetic signal, thereby removing the noise.

Figure 4:
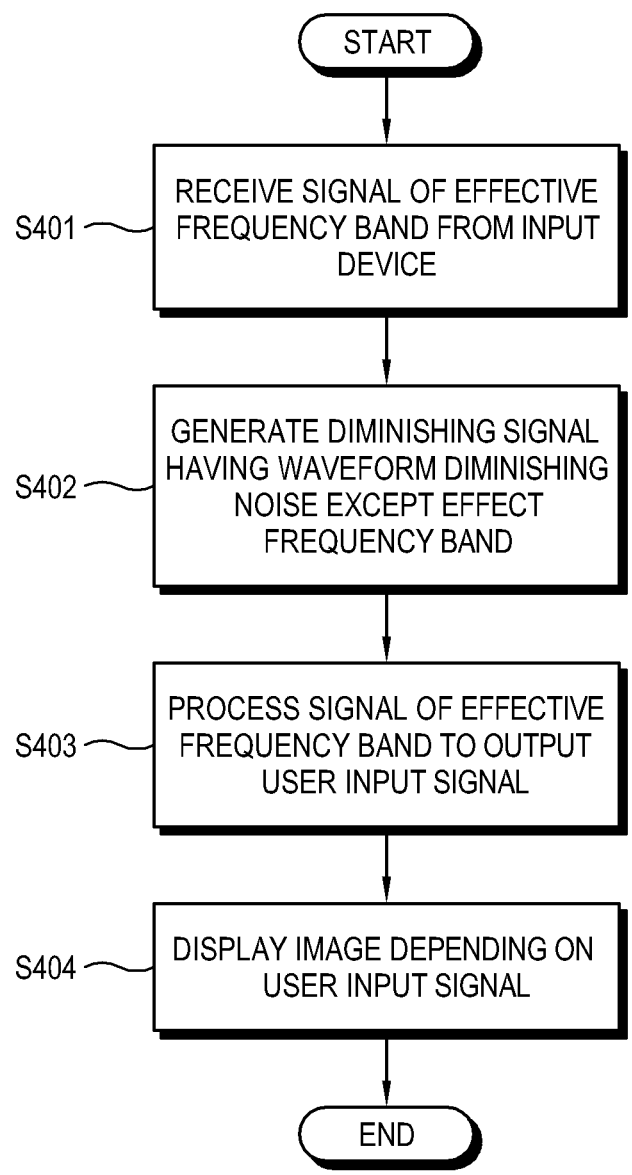
FIG. 4 illustrates a method of controlling interference, according to an exemplary embodiment.

FIG. 4 is a drawing illustrating a method of controlling interference in a display apparatus, according to an exemplary embodiment.

A display apparatus 100 receives a signal in an effective frequency band from an input device 200 (S401). In this case, the signal in the effective frequency band may be a magnetic signal. Also, the effective frequency band may include a band of a resonance frequency in which the input device 200 resonates. According to an exemplary embodiment, the band of the resonance frequency in which the input device 200 resonates may be approximately 532.25-593.75 KHz. The signal in the effective frequency band may be an analog value, and include a coordinate value of the input device 200, data on pressure being applied by the input device with respect to a corresponding coordinate, etc. More specifically, the signal in the effective frequency band may include at least one of information of a pointing coordinate, a pointing angle, an input information, speed and applied pressure of the input device 200.

The display apparatus 100 generates a diminishing signal having a waveform attenuating a noise outside the effective frequency band (S402). The diminishing signal is a signal having an interference waveform capable of attenuating a noise waveform. That is, the display apparatus 100 may generate a diminishing signal having an interference waveform capable of attenuating a noise waveform generated from a clock signal of an inner part thereof. For example, if the effective frequency band is approximately 532.25-593.75 KHz, values outside the range of approximately 532.25-593.75 KHz are attenuated, thereby preventing a noise from affecting the input signal.

According to an exemplary embodiment, a frequency band of a diminishing signal may be approximately 0-532 KHz and 594 KHz-1 MHz. More specifically, the display apparatus 100 may block a noise by generating a attenuating frequency corresponding to a surrounding frequency of approximately 532.25-593.75 KHz which is an operating frequency band.

The display apparatus 100 processes a signal in a received effective frequency band to output a user input signal (S403). More specifically, the display apparatus 100 may generate a user input signal by using information included in a signal in an effective frequency band; the information including, for example, a pointing coordinate, a pointing angle, an input information, speed, applied pressure, etc. of the input device 200. The generated user input signal is output to a configuration element of the display apparatus 100 such as a display unit 130, etc.

The display apparatus 100 displays an image depending on a user input signal (S404).

Using the method described above, a noise in the vicinity of an operating frequency band of the display apparatus 100 is diminished by generating a attenuating waveform, thereby blocking the noise. The method and display apparatus described above solves the problem where a resonance frequency generated in an EMR-type input device is distorted due to a noise, etc. generated in the display apparatus 100, which causes errors when recognizing the position and angle of the input device. Furthermore, since it is unnecessary to use an instrument for blocking a noise, slimming of the display apparatus 100 can be achieved.

As described above, according to the exemplary embodiments, by preventing a resonance frequency generated in an EMR-type input device from being interfered with by a noise, etc. generated in an inner part of a display apparatus, an error in recognizing the position and the angle of the input device can be prevented.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus, comprising:
   a signal receiving unit which receives a signal in an effective frequency band from an input device; and
   a diminishing signal generating unit which generates a diminishing signal which surrounds the effective frequency band and comprises a waveform diminishing a noise outside the effective frequency band,
   wherein the diminishing signal interferes with the noise generated from an inner part of the display apparatus or emanated from an outside source, and
   wherein the diminishing signal is in a frequency band that does not overlap with the effective frequency band.

2. The display apparatus according to claim 1, further comprising:
   a signal processing unit which processes the signal to output a user input signal; and
   a display unit which displays an image based on the user input signal.

3. The display apparatus according to claim 1, wherein the effective frequency band comprises a band of a resonance frequency in which the input device resonates.

4. The display apparatus according to claim 1, further comprising a magnetic field generating unit which generates a magnetic field inducing a resonance of the input device.

5. The display apparatus according to claim 1, wherein the signal in the effective frequency band comprises at least one information of a pointing coordinate, a pointing angle, input information, a speed and an applied pressure of the input device.

6. The display apparatus according to claim 1, wherein the noise is a signal comprising a frequency value of equal to or more than a predetermined amplitude in the effective frequency band.

7. The display apparatus according to claim 1, wherein a frequency band of the diminishing signal is a band of approximately 0-532 Kilohertz (KHz) and a band of approximately 594 KHz-1 Megahertz (MHz).

8. The display apparatus according to claim 1, wherein the diminishing signal generating unit generates the diminishing signal during a predetermined time when the signal in the effective frequency band is sensed.

9. A method of controlling interference in a display apparatus, comprising:
   receiving a signal from an input device in an effective frequency band;
   generating a diminishing signal which surrounds the effective frequency band and which comprises a waveform diminishing a noise outside the effective frequency band;
   outputting a user input signal by processing the signal received in the effective frequency band; and
   displaying an image based on the user input signal,
   wherein the diminishing signal interferes with the noise generated from an inner part of the display apparatus or emanated from an outside source, and
   wherein the diminishing signal is in a frequency band that does not overlap with the effective frequency band.

10. The method of controlling interference in the display apparatus according to claim 9, wherein the effective frequency band comprises a band of a resonance frequency in which the input device resonates.

11. The method of controlling interference in the display apparatus according to claim 9, further comprising generating a magnetic field inducing a resonance of the input device.

12. The method of controlling interference in the display apparatus according to claim 9, wherein a signal in the effective frequency band comprises at least one of information of a pointing coordinate, a pointing angle, input information, a speed and an applied pressure of the input device.

13. The method of controlling interference in the display apparatus according to claim 9, wherein the noise is a signal comprising a frequency value of equal to or more than a predetermined amplitude in the effective frequency band.

14. The method of controlling interference in the display apparatus according to claim 9, wherein a frequency band of the diminishing signal is a band of approximately 0-532 KHz and a band of approximately 594 KHz-1 MHz.

15. The method of controlling interference in the display apparatus according to claim 9, wherein generating the diminishing signal comprises generating the diminishing signal during a predetermined time when a signal in the effective frequency band is sensed.

16. The display apparatus according to claim 2, wherein the signal receiving unit outputs the received signal at substantially same time to both the signal processing unit and to the diminishing signal generating unit.

17. The display apparatus according to claim 1, further comprising a signal processing unit which processes the signal received by the signal receiving unit,
   wherein the signal receiving unit outputs the received signal to both the signal processing unit and to the diminishing signal generating unit, and
   wherein when the diminishing signal generating unit senses the received signal from the signal receiving unit, the diminishing signal generating unit starts generating the waveform which is new.

18. The display apparatus according to claim 2, wherein the diminishing signal generating unit generates the diminishing signal that is output outside the display apparatus, wherein the signal processing unit outputs the processed signal to the display unit which displays the signal on a screen of the display apparatus, and wherein the output diminishing signal interferes with noise present in the output signal.

19. The display apparatus according to claim 1, wherein the diminishing signal is in a frequency band of at least one of approximately 0 to 532 KHz and a frequency band of approximately 594 KHz to 1 MHz when the effective frequency band is in a range of approximately 532.25 KHz to 593.75 KGz.

20. The display apparatus according to claim 1, wherein the diminishing signal is a waveform which deviates from an amplitude of the effective frequency band by at least two volts and wherein the diminishing signal generating unit generates the diminishing signal during an initial time when the signal in the effective frequency band is sensed.

* * * * *